(No Model.)

R. H. P. ELLIS.
LEAF HOLDING DEVICE FOR BOOKS.

No. 560,025. Patented May 12, 1896.

WITNESSES:
Lee J. Van Horn.
Charles B. Mann Jr.

INVENTOR:
R. H. P. Ellis
By Chas B. Mann
ATTORNEY.

UNITED STATES PATENT OFFICE.

ROBERT H. P. ELLIS, OF BALTIMORE, MARYLAND.

LEAF-HOLDING DEVICE FOR BOOKS.

SPECIFICATION forming part of Letters Patent No. 560,025, dated May 12, 1896.

Application filed January 16, 1896. Serial No. 575,669. (No model.)

*To all whom it may concern:*

Be it known that I, ROBERT H. P. ELLIS, a citizen of the United States, residing at Baltimore, in the State of Maryland, have invented certain new and useful Improvements in Devices for Holding Open the Leaves of Books, of which the following is a specification.

This invention relates to improvements in wire clips for holding the leaves of open books. The object of the invention is to provide a wire clip or leaf-holder which shall combine two features, to wit: first, two tangs, to penetrate between the leaves, said tangs to be relatively longer than the two arms which hold the leaves open, whereby when in use the device may be slipped upward sufficiently far to release the two short holding-arms from the leaves without withdrawing the tangs, and, second, to construct the two tangs which penetrate between the leaves so that their extremities shall press toward each other, whereby they will act as a gripper and by gripping the leaves prevent the device from accidentally falling out or detaching when a leaf of the book is being turned.

Figure 1:
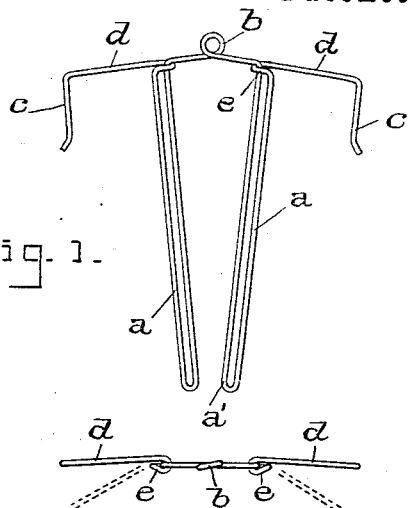
Figure 2:
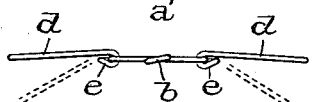
Figure 3:
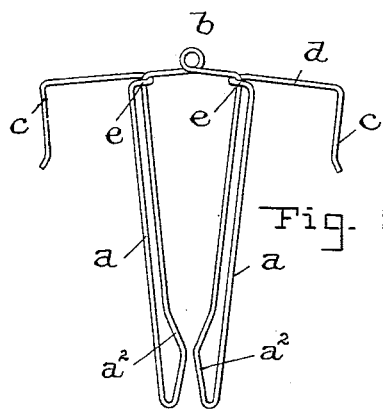
Figure 4:
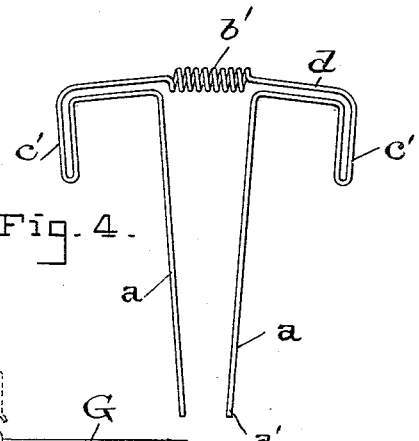
Figure 5:
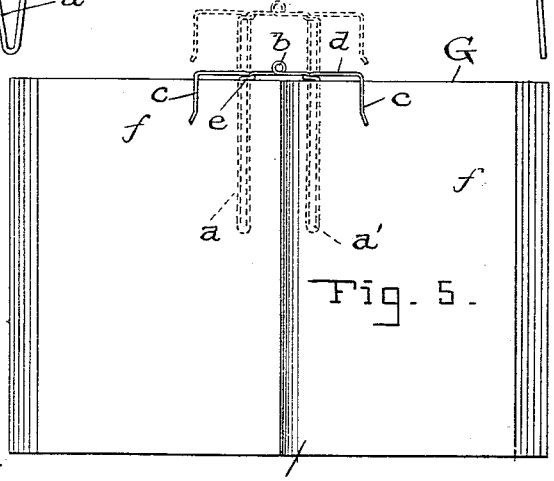

Figure 1 is a view showing one form of constructing a device embodying my invention. Fig. 2 is a top view of the device of Fig. 1. Fig. 3 shows another form. Fig. 4 shows still another form. Fig. 5 shows an open book with the device applied.

The leaf-holder is made of one piece of wire. The letter $a$ designates the two relatively long tangs, the extremities $a'$ of which normally approach each other. At the top of the holder and at the central part the wire is formed into a spring-coil $b$, which gives resiliency to the tangs and allows their said extremities $a'$ to be spread apart. These features are common to all three forms of devices shown in the drawings.

The letter $c$ designates the two arms, which press down upon the open leaves $f$ of the book G, as shown in Fig. 5. These arms are shorter than the tangs $a$ and are connected thereto by an intermediate bar $d$.

In certain particulars not yet mentioned the three forms of devices shown in the drawings differ from each other. In Figs. 1 and 4 the extremities $a'$ of the long tangs have a straight termination; but in Fig. 3 each long tang $a$ has at or near its extremity a lateral projection $a^2$, and these constitute the gripper. When the leaf-holding device is in use in a book, these grip extremities, either $a'$ or $a^2$, will grip the leaves close to the part where they are sewed or bound into the cover of the book and thereby keep the device from slipping out when it is shifted to allow a leaf to be turned.

In Figs. 1, 2, and 3 each tang $a$ comprises two parallel stretches of wire, and the intermediate bars $d$ have a U-shaped loop-bend $e$, which interlocks with one of the said parallel stretches of wire. This produces a sort of hinge-joint, and while allowing the leaf-arms $c$ to swing a little at the same time prevents the two parallel stretches from spreading apart.

In Fig. 4 the tangs $a$ comprise the terminal ends of the wire and have one single stretch instead of two parallel stretches. The two presser-arms $c'$, however, in this figure comprise two parallel stretches. In other words, these arms $c'$ are double-bent wire. In this figure the top central coil is different from that in the other figures. Here the coil $b'$ is a spiral.

By reference to Fig. 5 the broken lines above the book G illustrate how the device may be slipped upward far enough to release the two short arms $c$ from the open leaves $f$, while the long tangs $a$ remain penetrated in between the leaves and with their extremities continuing to grip said leaves close to the part where they are sewed or bound into the cover.

What I claim as new, and desire to secure by Letters Patent of the United States, is—

A wire leaf-holder for open books, consisting of the two tangs each having the two parallel stretches of wire the extremities of which normally approach each other to serve as grippers; two leaf-pressing arms, $c$, relatively shorter than said tangs, and intermediate bars, $d$, to which said short arms are attached each of said bars having a loop bend, $e$, which interlocks with one of said parallel stretches of the tangs and thereby forms a hinge-joint, as set forth.

In testimony whereof I affix my signature in the presence of two witnesses.

ROBERT H. P. ELLIS.

Witnesses:
CHARLES B. MANN, Jr.,
LEE I. VAN HORN.